(12) United States Patent
Fiorentino et al.

(10) Patent No.: US 7,489,436 B1
(45) Date of Patent: Feb. 10, 2009

(54) HYBRID INTEGRATED SOURCE OF POLARIZATION-ENTANGLED PHOTONS

(75) Inventors: Marco Fiorentino, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/900,347

(22) Filed: Sep. 11, 2007

(51) Int. Cl.
*G02F 1/35* (2006.01)
*H01S 3/10* (2006.01)

(52) U.S. Cl. .......... 359/326; 359/332; 372/21

(58) Field of Classification Search ......... 359/326–332; 372/21–22
See application file for complete search history.

(56) References Cited

U.S. PATENT DOCUMENTS

| | | | |
|---|---|---|---|
| 6,862,130 B2* | 3/2005 | Batchko et al. | 359/326 |
| 2008/0063015 A1* | 3/2008 | Trifonov et al. | 372/18 |

* cited by examiner

*Primary Examiner*—Hemang Sanghavi

(57) ABSTRACT

Various embodiments of the present invention are directed to systems configured to generate polarization-entangled photons. In one embodiment of the present invention, a polarization-entangled photon source comprises a down conversion crystal having a first waveguide and a second waveguide, a dielectric spacer positioned adjacent to the down conversion crystal and configured to receive electromagnetic radiation emitted from the first waveguide, and a half-wave plate positioned adjacent to the down conversion crystal and configured to receive electromagnetic radiation emitted from the second waveguide. The polarization-entangled photon source also includes a beam displacer positioned adjacent to the dielectric spacer and the half-wave plate and configured to combine the electromagnetic radiation output from the dielectric spacer and the half-wave plate into a single beam of electromagnetic radiation.

19 Claims, 14 Drawing Sheets

HYBRID INTEGRATED SOURCE OF POLARIZATION-ENTANGLED PHOTONS

TECHNICAL FIELD

Embodiments of the present invention relate to nonlinear optical devices, and in particular, to compact, nonlinear-optics-based devices for generating photons in polarization-entangled states.

BACKGROUND

Recent and promising advancements in fields ranging from materials science to quantum physics are now being used to generate new quantum-system-based technologies. These quantum systems can be used to encode and transmit quantum information. In particular, quantum systems comprising just two discrete states, represented by "|0⟩" and "|1⟩," can potentially be employed in a variety of quantum-system-based applications including quantum information encoding and processing, optical quantum lithography, and metrology, just to name a few. A quantum system comprising two discrete states is called a "qubit system," and the states |0⟩ and |1⟩, called "qubit basis states," can also be represented in set notation as $\{|1\rangle, |1\rangle\}$. A qubit system can exist in the state |0⟩, the state |1⟩, or in any of an infinite number of states that simultaneously comprise both |0⟩ and |1⟩, which can be mathematically represented by a linear superposition of states as follows:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

Performing a measurement on a quantum system is mathematically equivalent to projecting the state of the quantum system onto one of the basis states, and, in general, the probability of projecting the state of the quantum system onto a basis state is equal to the square of the coefficient associated with the basis state. For example, when the state $|\psi\rangle$ of the qubit system is measured in the basis $\{|0\rangle, |1\rangle\}$, one has a probability $|\alpha|^2$ of finding the quantum system in the state $|0\rangle$ and a probability $|\beta|^2$ of finding the quantum system in the state $|1\rangle$.

The infinite number of pure states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where
$0 \leq \theta < \pi$, and
$0 \leq \phi < 2\pi$.

FIG. 1A illustrates a Bloch sphere representation of a qubit system. In FIG. 1A, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state |0⟩ and, in part, the state |1⟩. However, once the state of the qubit system is measured in the basis $\{|0\rangle, |1\rangle\}$, the state of the qubit system is projected onto the state |0⟩ 110 or onto the state |1⟩ 112.

Photon states of electromagnetic radiation can be used as qubit basis states in quantum information processing and quantum computing applications. The term "photon" refers to a single quantum of excitation energy of an electromagnetic field mode of electromagnetic radiation. The electromagnetic radiation can be in the form of propagating electromagnetic waves, each electromagnetic wave comprising both a transverse electric field component, $\vec{E}$, and an orthogonal transverse magnetic field component, $\vec{B}$. FIG. 1B illustrates the transverse electric and magnetic field components of an electromagnetic wave propagating in the direction, $\vec{k}$. As shown in FIG. 1B, the electromagnetic wave is directed along the z-axis 120. The transverse electric field ("TE") component $\vec{E}$ 122 and the transverse magnetic field ("TM") component $\vec{B}$ 124 are directed along the orthogonal x- and y-axes 126 and 128, respectively. Although the TE and TM are shown in FIG. 1B to have identical amplitudes, in real life the amplitude of the TM component is smaller than the amplitude of the TE component by a factor of 1/c, where c represents the speed of light in free space ($c=3.0\times10^8$ m/sec). Because of the large discrepancy in the magnitude of the electric field component and the magnitude of the magnetic field component, the electric field component alone typically accounts for most of the electromagnetic wave interactions with matter.

Polarized photon states of electromagnetic waves can also be used as qubit basis states in quantum information processing and quantum computing. Two commonly used basis states are vertically and horizontally polarized photons of electromagnetic waves. The terms "vertical" and "horizontal" are relative with respect to a coordinate system and are used to refer to electromagnetic waves that are oriented orthogonal to one another. FIGS. 2A-2B illustrates vertically and horizontally polarized photons, respectively. In FIGS. 2A-2B, vertically and horizontally polarized photons are represented by oscillating, continuous sinusoidal waves that represent the electric field components propagating along z-coordinate axes 202 and 204, respectively. As shown in FIG. 2A, a vertically polarized photon |V⟩ corresponds to an electric field component that oscillates in the yz-plane. Directional arrow 206 represents one complete oscillatory cycle of the electric field component of |V⟩ in the xy-plane 208 as |V⟩ advances along the z-coordinate axis 202 through one complete wavelength. In FIG. 2B, a horizontally polarized photon |H⟩ corresponds to an electric field component that oscillates in the xz-plane. Directional arrow 210 represents one complete oscillatory cycle of the electric field component of |H⟩ in the xy-plane 212 as |H⟩ advances along the z-coordinate axis 204 through one complete wavelength.

The state of a system comprising two or more qubit systems can be represented by a tensor product of qubits, each qubit associated with one of the qubit systems. For example, the tensor product of a system comprising a first qubit system and a second qubit system is given by:

$$|\psi\rangle_{12} = |\psi\rangle_1 |\omega\rangle_2$$

where the state of the first qubit system is:

$$|\psi\rangle_1 = \frac{1}{\sqrt{2}}(|0\rangle_1 + |1\rangle_1)$$

and the state of the second qubit system is:

$$|\psi\rangle_2 = \frac{1}{\sqrt{2}}(|0\rangle_2 + |1\rangle_2)$$

The state $|\psi\rangle_{12}$ can also be rewritten as a linear superposition of products of basis states:

$$|\psi\rangle_{12} = |\psi\rangle_1 |\psi\rangle_2 = \frac{1}{2}(|0\rangle_1|0\rangle_2 + |0\rangle_1|1\rangle_2 + |1\rangle_1|0\rangle_2 + |1\rangle_1|1\rangle_2)$$

where the terms $|0\rangle_1|0\rangle_2$, $|0\rangle_1|1\rangle_2$, $|1\rangle_1|0\rangle_2$, and $|1\rangle_1|1\rangle_2$ are a basis of the tensor product space. Each product state in the state $|\psi\rangle_{12}$ has an associated coefficient of ½, which indicates that when the state of the first qubit system is measured in the bases $\{|0\rangle_1,|1\rangle_1\}$, and the state of the second qubit system is measured in the basis $\{|0\rangle_2,|1\rangle_2\}$ there is a ¼ ($|½|^2$) probability of the combined qubit systems being found in any one of the product states.

Certain states of the combined qubit systems, however, cannot be represented by a product of associated qubits. These qubit systems are said to be "entangled." Quantum entanglement is a unique property of quantum mechanics in which the states of two or more quantum systems are correlated, even though the quantum systems can be spatially separated. An example entangled-state representation of an entangled two-qubit system is given by:

$$|\psi^+\rangle_{12} = \frac{1}{\sqrt{2}}(|0\rangle_1|1\rangle_2 + |1\rangle_1|0\rangle_2)$$

The entangled state $|\psi^+\rangle_{12}$ cannot be factored into a product of the qubits $\alpha_1|0\rangle_1+\beta_1|1\rangle_1$ and $\alpha_2|0\rangle_2+\beta_2|1\rangle_2$, for any choice of the parameters $\alpha_1$, $\beta_1$, $\alpha_2$, and $\beta_2$.

The state of an un-entangled, two-qubit system can be distinguished from the state of an entangled, two-qubit system as follows. Consider an un-entangled, two-qubit system in the state $|\psi\rangle_{12}$. Suppose a measurement performed on the first qubit system in the basis $\{|0\rangle_1,|1\rangle_1\}$ projects the state of the first qubit system onto the state $|0\rangle_1$. According to the state $|\psi\rangle_{12}$, the state of the un-entangled, two-qubit system immediately after the measurement is the linear superposition of states $(|0\rangle_1|0\rangle_2+|0\rangle_1|1\rangle_2)/\sqrt{2}$. When a second measurement is performed on the second qubit system in the basis $\{|1\rangle_2,|1\rangle_2\}$ immediately following the first measurement in an identical reference frame, there is a ½ probability of projecting the state of the second qubit system onto the state $|0\rangle_2$ and a ½ probability of projecting the state of the second qubit system onto the state $|1\rangle_2$. In other words, the state of the second qubit system is not correlated with the state of the first qubit system.

In contrast, consider an entangled, two-qubit system in the entangled state $|\psi^+\rangle_{12}$. Suppose that a first measurement performed on the first qubit system in the basis $\{|0\rangle_1,|1\rangle_1\}$ also projects the state of the first qubit system onto the state $|0\rangle_1$. According to the entangled state $|\psi^+\rangle_2$, the state of the entangled, two-qubit system after the first measurement is the product state $|0\rangle_1|1\rangle_2$. When a second measurement is performed on the second qubit system in the basis $\{|0\rangle_2,|1\rangle_2\}$, the state of the second qubit system is $|1\rangle_2$ with certainty. In other words, the state of the first qubit system is correlated with the state of the second qubit system.

Entangled quantum systems have a number of different and practical applications in fields ranging from quantum computing to quantum information processing. In particular, the polarization entangled-photons described above can be used in quantum information processing, quantum cryptography, teleportation, and linear optics quantum computing. Examples of polarization entangled-photons that can be used in a number of different entangled-state applications are the Bell states given by:

$$|\psi^-\rangle = \frac{1}{\sqrt{2}}(|H\rangle_1|V\rangle_2 - |V\rangle_1|H\rangle_2),$$

$$|\psi^+\rangle = \frac{1}{\sqrt{2}}(|H\rangle_1|V\rangle_2 - |V\rangle_1|H\rangle_2),$$

$$|\phi^-\rangle = \frac{1}{\sqrt{2}}(|V\rangle_1|V\rangle_2 - |H\rangle_1|H\rangle_2), \text{ and}$$

$$|\phi^+\rangle = \frac{1}{\sqrt{2}}(|V\rangle_1|V\rangle_2 + |H\rangle_1|H\rangle_2)$$

where the subscripts "1" and "2" can represent different transmission channels or different wavelengths.

Although polarization-entangled photons have a number of potentially useful applications, polarization-entangled photon sources typically cannot be practically implemented in a wide variety of entangled state applications. For example, in "New High-Intensity Source of Polarization-Entangled Photon Pairs," by Kwiat et al., *Physical Review Letters*, vol. 75, 4337, (1995), Kwiat describes a high-intensity source of polarization entangled-photon Bell states that works for continuous electromagnetic waves but not for electromagnetic wave pulses. In addition, only photons emitted in a particular direction are entangled. As a result, only a limited number of photons can be generated. In "Ultrabright source of polarization-entangled photons," by Kwiat et al., *Physical Review A*, vol. 60, R773, (1999), Kwiat also describes a source of polarization-entangle photon pairs. However, thin crystals and continuous wave pumps have to be used in order to obtain good entanglement. In "Phase-stable source of polarization-entangled photons using a polarization Sagnac interferometer," by Taehyun Kim et al., *Physical Review A*, vol. 73, 012316 (2006) and in "Generation of ultrabright tunable polarization entanglement without spatial, spectral, or temporal constraints," by Fiorentino et al., *Physical Review A*, vol. 69, 041801(R) (2004), both Kim and Fiorentino describe an ultrabright parametric down-conversion source of Bell state polarization-entangled photons. However, these polarization-entangled photon sources cannot be used in microscale applications, are expensive to produce, and need periodic adjustments. Physicists have recognized a need for polarization entangled photon sources that are compatible with both continuous wave and pulse pump sources and can be coupled to fiber optic couplers for implementation in microscale devices.

SUMMARY

Various embodiments of the present invention are directed to devices that are configured to generate polarization-entangled photons. In one device embodiment of the present invention, a polarization-entangled photon source comprises a down conversion crystal having a first waveguide and a second waveguide, a dielectric spacer positioned adjacent to the down conversion crystal and configured to receive electromagnetic radiation emitted from the first waveguide, and a half-wave plate positioned adjacent to the down conversion crystal and configured to receive electromagnetic radiation emitted from the second waveguide. The polarization-entangled photon source also includes a beam displacer positioned adjacent to the dielectric spacer and the half-wave plate and configured to combine the electromagnetic radiation output from the dielectric spacer and the half-wave plate into a single beam of electromagnetic radiation.

DETAILED DESCRIPTION

Figure 1A:
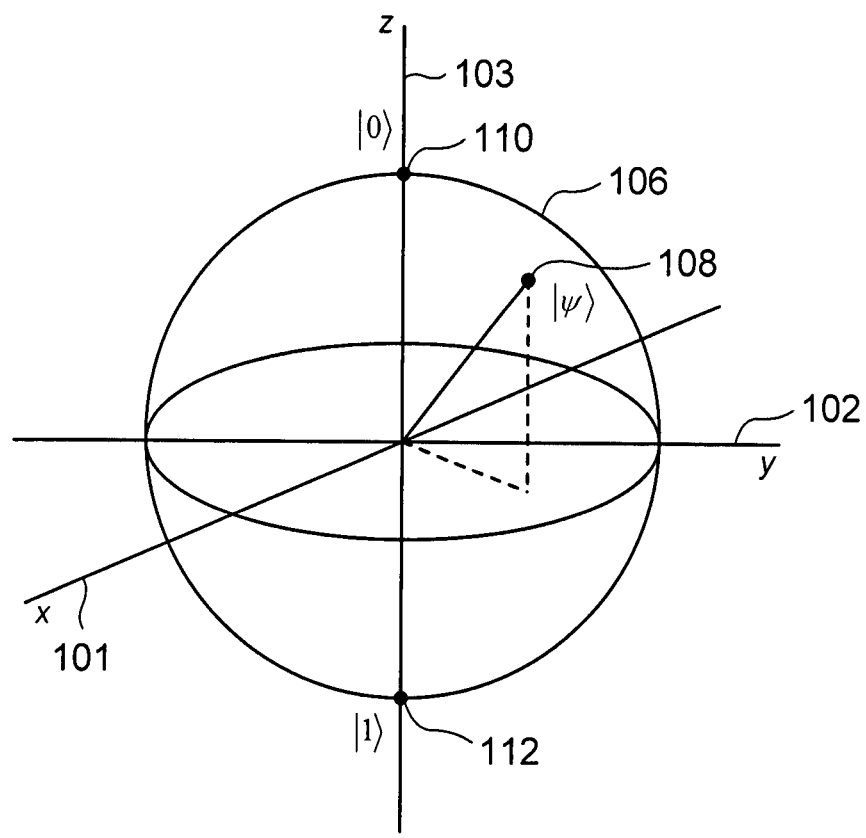
FIG. 1A shows a Bloch sphere representation of a qubit system.
Figure 1B:
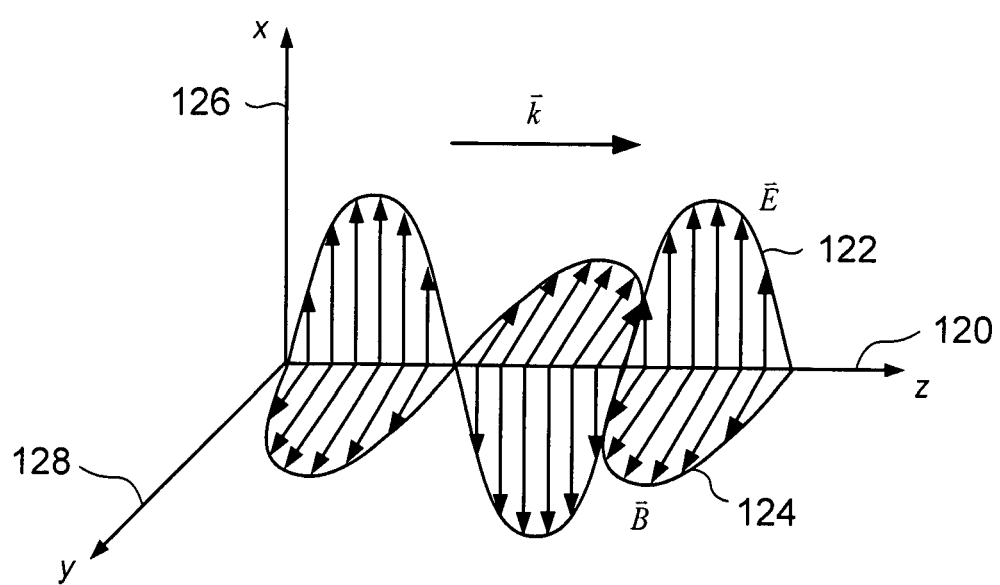
FIG. 1B shows transverse electric field and transverse magnetic field components of a propagating electromagnetic wave.
Figure 2A:
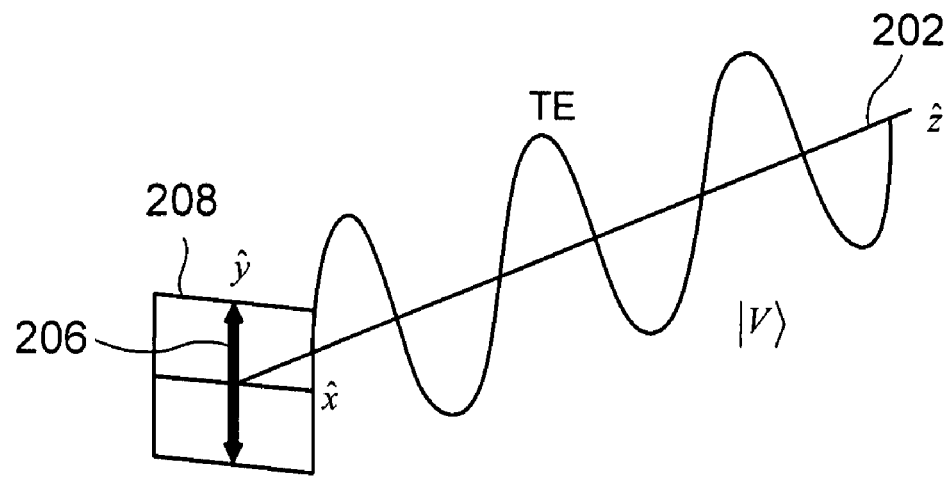
FIGS. 2A-2B shows vertically and horizontally polarized photon basis states.
Figure 2B:
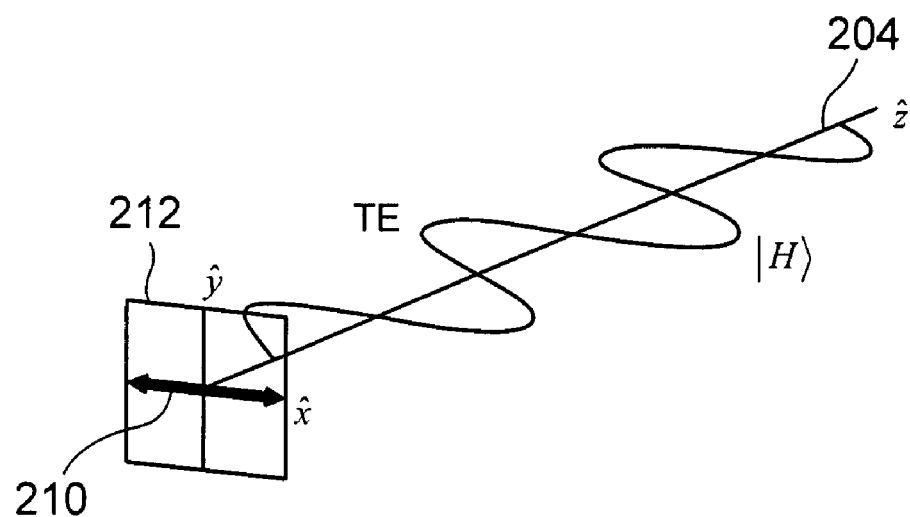

Various embodiments of the present invention are directed to devices that are configured to generate polarization-entangled photons. In particular, device embodiments of the present invention can be used to generate photons in polarization-entangled Bell states. Device embodiments of the present invention employ beam splitters, half-wave plates, birefringent crystals, and spontaneous parametric down conversion, which are described in a first subsection. Embodiments of the present invention are provided in a subsequent subsection. In the descriptions of the various embodiments provided below, a number of structurally similar components comprising the same materials have been provided with the same reference numerals and, in the interest of brevity, an explanation of their structure and function is not repeated.

Figure 3A:
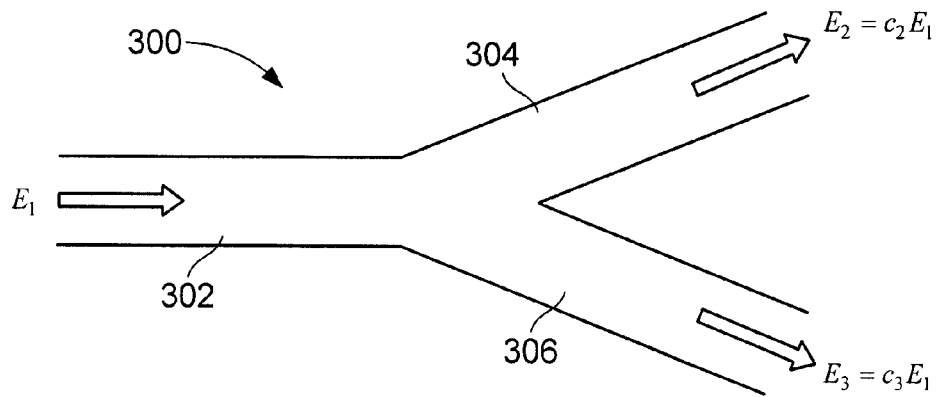
FIG. 3A shows a Y-shaped beamsplitter.

Beams Splitters, Half-Wave Plates, Birefringent Crystals, and Spontaneous Parametric Down Conversion Beamsplitters ("BSs") are prominent components of optical signal-based computing and information processing systems. FIG. 3A shows a schematic representation of a Y-shaped BS 300. The Y-shaped BS 300 comprises an input waveguide 302, a first output waveguide 304, and a second output waveguide 306. The energy associated with the input and output beams of electromagnetic radiation is conserved, for a Y-shaped BS 300 that is free of any lossless processes that can remove energy from the input electric fields. As shown in FIG. 3A, an incident beam of electromagnetic radiation, with an electric field amplitude represented by $E_1$, is split into two separate beams with electric field amplitudes:

$$E_2 = c_2 E_1, \text{ and}$$

$$E_3 = c_3 E_1$$

where $c_2$ and $c_3$ represent complex-valued coefficients that satisfying the condition:

$$|c_2|^2 + |c_3|^2 = 1;$$

the beam with the electric-field component $E_2$ is transmitted in the output waveguide 304; and the beam with the electric-field component $E_3$ is transmitted in the output waveguide 306.

When the output waveguides 304 and 306 are symmetric, the Y-shaped BS 300 transmits 50% of the flux density of the incident beam in the output waveguide 304 and 50% in the output waveguide 306. The Y-shaped BS can be called a "50:50 beamsplitter," and the corresponding coefficients $c_1$ and $c_2$ can both be equal to $1/\sqrt{2}$. In other words, the output waveguides 304 and 306 both transmit the same fraction of the flux density of an incident beam transmitted in the waveguide 302.

Figure 3B:
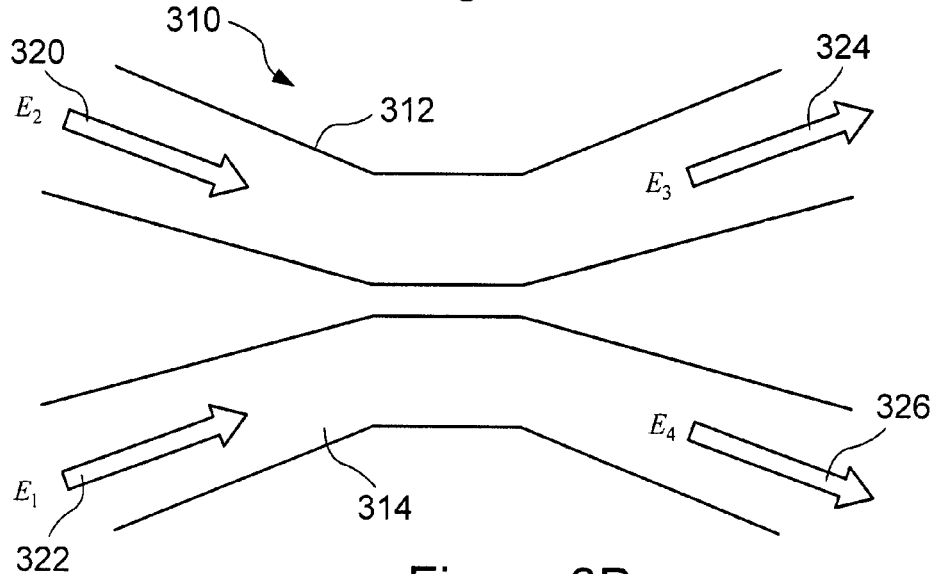
FIG. 3B shows a schematic representation of a beamsplitter combiner.
Figure 3C:
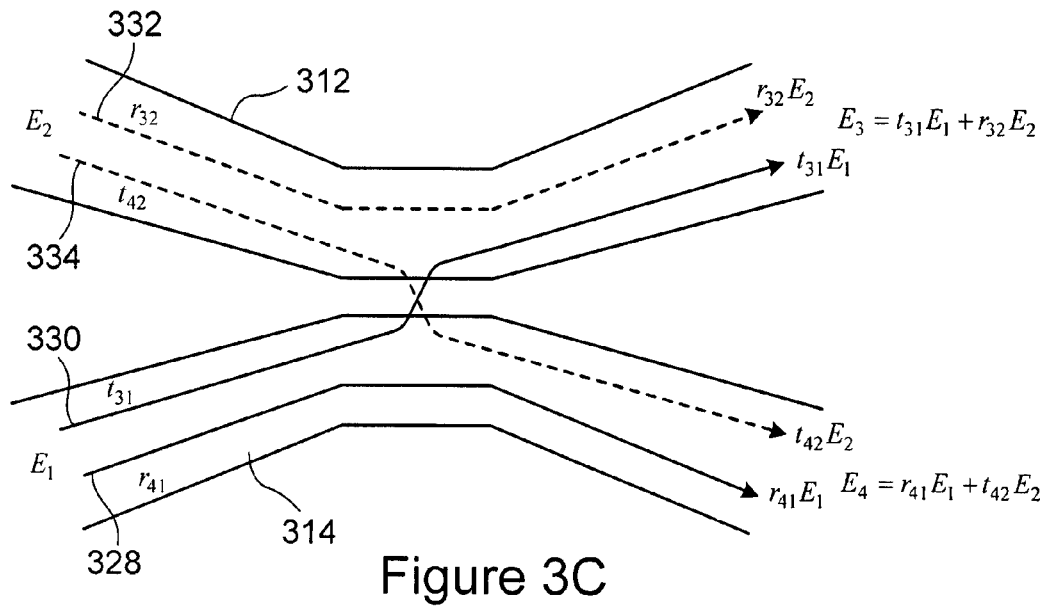
FIG. 3C shows reflections and transmissions of beams input to the beamsplitter combiner shown in FIG. 3B.

FIG. 3B shows a schematic representation of a beamsplitter combiner ("BSC") 310. The BSC 310 comprises a first waveguide 312 and a second waveguide 314. Directional arrows 320 and 322 represent input beams of electromagnetic radiation with electric field amplitudes $E_1$ and $E_2$, respectively, and directional arrows 324 and 326 represents output beams of electromagnetic radiation with electric fields amplitudes denoted by $E_3$ and $E_4$, respectively. FIG. 3C shows reflections and transmissions of the beams input to the BSC 310. Directional arrows 328 and 330 represent reflection and transmission paths of the electric field $E_1$, respectively, and dashed-line directional arrows 332 and 334 represent reflection and transmission paths of the electric field $E_2$, respectively. In FIG. 3C, $r_{41}E_1$ and $t_{31}E_1$ represent quantities of the electric field $E_1$ that are reflected and transmitted, and $r_{32}E_2$ and $t_{42}E_2$ represent quantities of the electric field $E_2$ that are reflected and transmitted, where $r_{31}$ and $r_{42}$ represent complex-valued reflection coefficients, and $t_{41}$ and $t_{32}$ represent complex-valued transmission coefficients, that satisfy the relations:

$$|r_{31}|^2 + |t_{41}|^2 = |r_{42}|^2 + |t_{32}|^2 = 1, \text{ and}$$

$$r_{31} t_{32}^* + t_{41} r_{42}^* = 0$$

For a BSC 310 free of any lossless processes that can remove energy from the input electric fields, the energy associated with the input and output electric fields is conserved. As a result, the input electric field amplitudes $E_1$ and $E_2$ and the output electric field amplitudes $E_3$ and $E_4$ can be mathematically related by the matrix equation:

$$\begin{bmatrix} E_3 \\ E_4 \end{bmatrix} = \begin{bmatrix} t_{31} & r_{32} \\ r_{41} & t_{42} \end{bmatrix} \begin{bmatrix} E_1 \\ E_2 \end{bmatrix}$$

When BSC 310 reflects and transmits 50% of an incident beam BSC 310 can also be called a "50:50 beamsplitter," and the reflection and transmission coefficients can be given by:

$$U_{BS} = \frac{1}{\sqrt{2}} \begin{bmatrix} 1 & 1 \\ -1 & 1 \end{bmatrix}$$

Figure 4A:
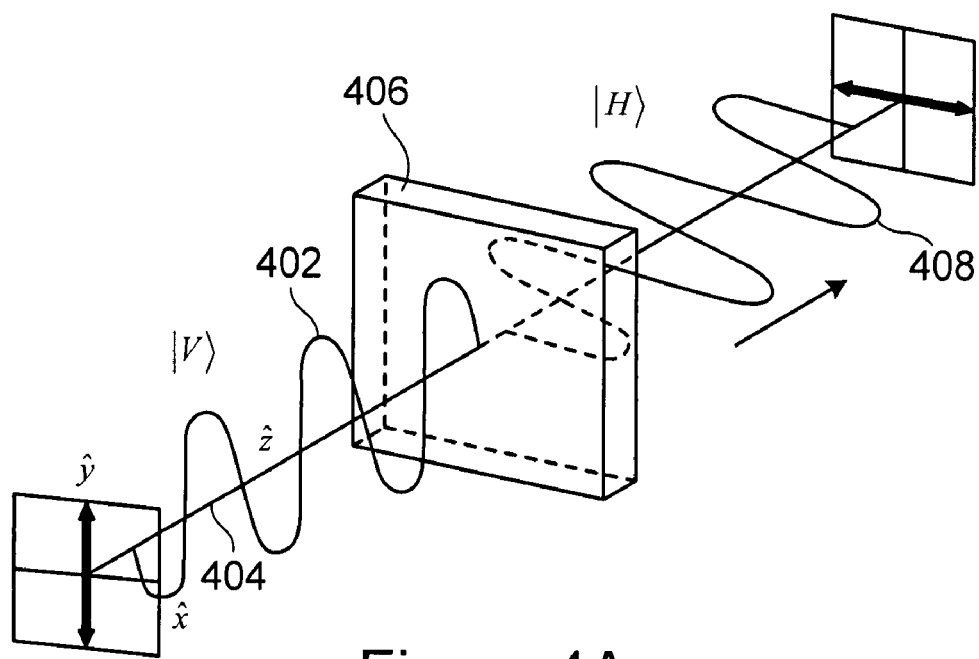
FIGS. 4A-4B show polarization state changes of vertically and horizontally polarized photons incident upon a half-wave plate, respectively.
Figure 4B:
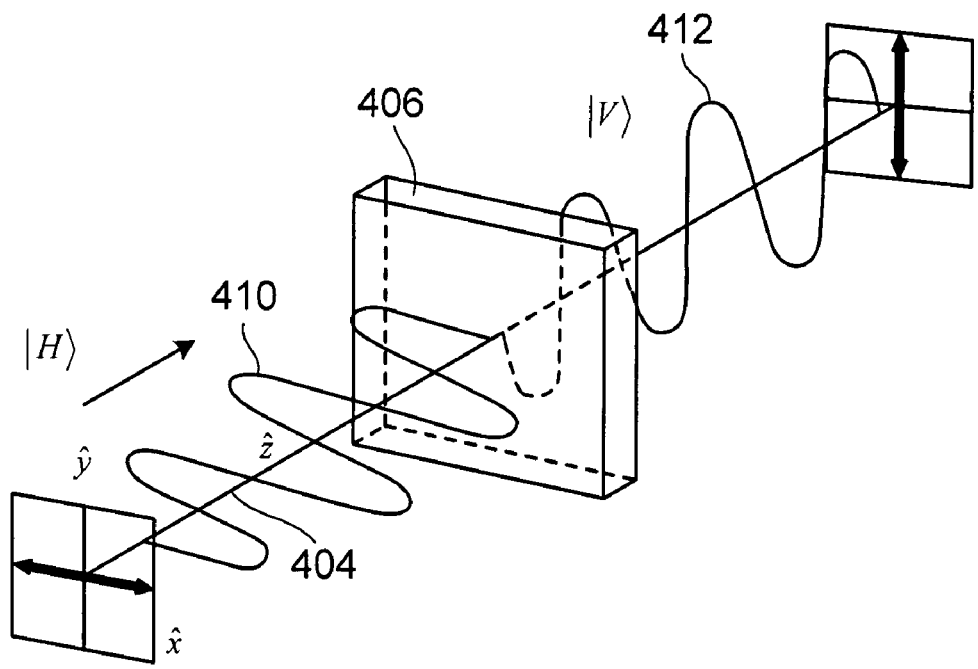

A half-wave plate ("HWP") rotates the polarization of an incident linearly polarized photon by an angle that is twice the angle formed by the incident polarization and the HWP axis. For example, a HWP with its axis forming a 45° angle with respect to a horizontal direction rotates an incident vertically polarized photon into a horizontally polarized photon, and rotates an incident horizontally polarized photon into a vertically polarized photon. FIGS. 4A-4B show polarization state changes of vertically and horizontally polarized photons incident upon such a HWP, respectively. In FIG. 4A, a vertically polarized photon $|V\rangle$ 402 propagates along a z-coordinate axis 404 and impinges on the front side of a HWP 406. As the vertically polarized photon $|V\rangle$ 402 passes through the HWP 406, a horizontally polarized photon $|H\rangle$ 408 emerges from the opposite side of the HWP 406. In FIG. 4B, a horizontally polarized photon $|H\rangle$ 410 propagates along the z-coordinate axis 404 to the front side of the same HWP 406. As the horizontally polarized photon $|H\rangle$ 410 passes through the HWP 406, a vertically polarized photon $|V\rangle$ 412 emerges from the opposite side of the HWP 406.

Figure 5:
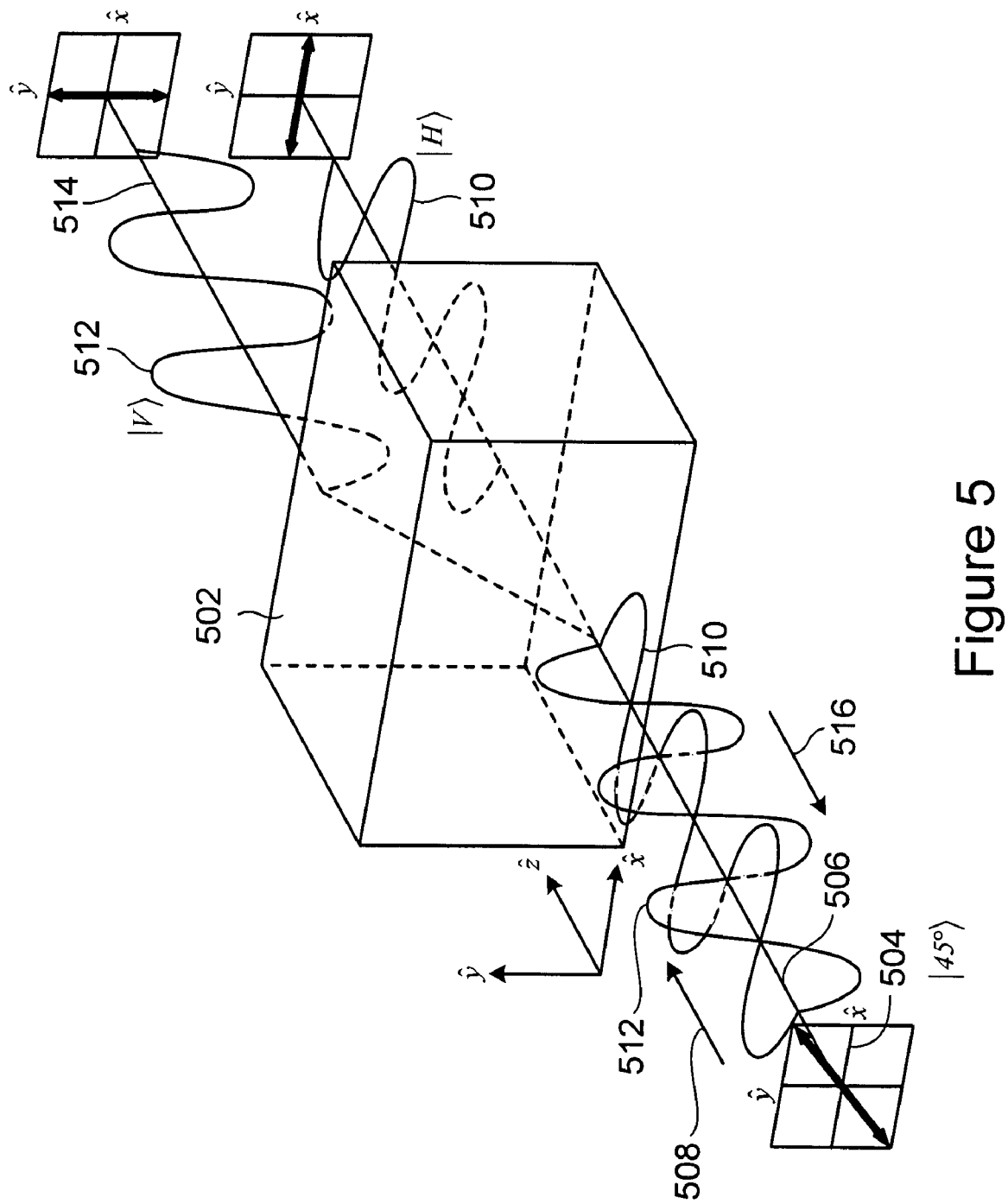
FIG. 5 shows an isometric view of a hypothetical birefringent crystal.

Birefringent crystals display two different indices of refraction. The crystals can be comprised can be $\alpha$-BaBr$_2$O$_4$ ("$\alpha$-BBO"), CaCO$_3$ ("calcite"), NbO ("niobium oxide"), LiB$_3$O$_5$ ("lithium triborate" or "LBO"). Each index of refraction depends on the polarization state of an incident photon and the orientation of the birefringent crystal with respect to the propagating direction of the incident photon. A birefringent crystal can be used to separate horizontally and vertically polarized electromagnetic waves. FIG. 5 shows an isometric view of a hypothetical birefringent crystal 502. An incident photon polarized at 45° to an x-coordinate axis 504 propagates along in the z-direction along a first transmission channel 506 to the birefringent crystal 502 in the direction identified by directional arrow 508. The incident photon can be mathematically represented by a coherent linear superposition of vertically and horizontally polarized states as follows:

$$|45°\rangle = \frac{1}{\sqrt{2}}(|H\rangle + |V\rangle)$$

where $|H\rangle$ represents a horizontally polarized photon 510 that lies in an xz-plane of the birefringent crystal 502; and $|V\rangle$ represents a vertically polarized photon 512 that lies in a yz-plane of the birefringent crystal 502.

As shown in FIG. 5, the horizontally polarized photon $|H\rangle$ 510 passes through the birefringent crystal 502 undeflected and continues propagating along the first transmission channel 406, whereas the vertically polarized photon $|V\rangle$ 512 is deflected within the birefringent crystal 502 and emerges from the birefringent crystal 502 on a second transmission channel 514. A birefringent crystal can also be used to combine a vertically polarized photon with a horizontally polarized photon in order to obtain a coherent linear superposition of photons. For example, reversing the propagation directions of the horizontally polarized photon $|H\rangle$ 510 and the vertically polarized photon $|V\rangle$ 512 produces the 45° polarized photon $|45°\rangle$ propagating in the direction identified by a directional arrow 516.

Figure 6:
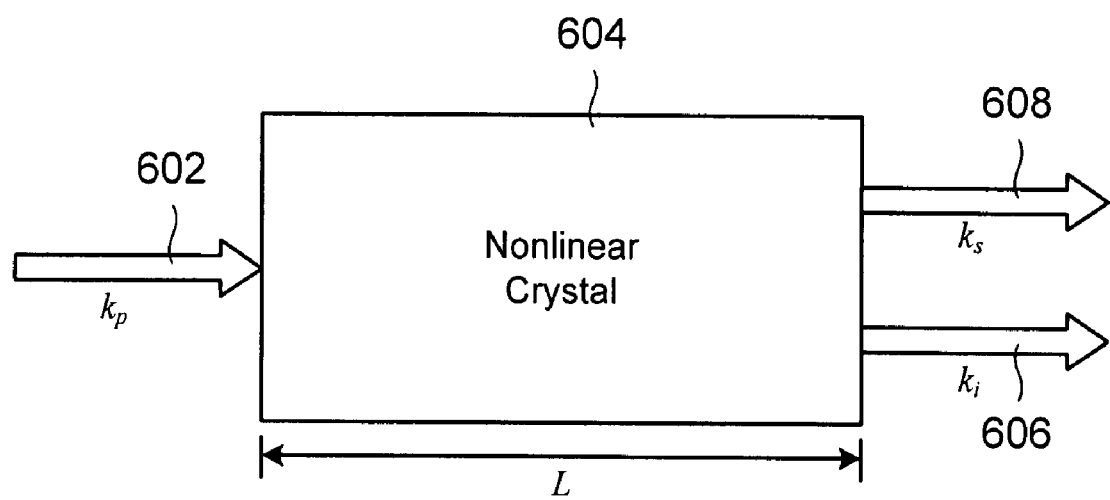
FIG. 6 shows a birefringent nonlinear crystal that splits a pump beam into signal and idler photon beams.

In spontaneous parametric-down conversion ("SPDC"), a birefringent, nonlinear crystal splits an incident beam of electromagnetic radiation in a coherent state $|\alpha\rangle$, called a "pump beam," into a pair of photon beams called a "signal beam" and an "idler beam." FIG. 6 shows a birefringent nonlinear crystal that splits a pump beam in a coherent state $|\alpha\rangle$ into a pair of signal and idler photon beams. In FIG. 6, a pump beam 602 having a frequency $\omega_p$ and wavenumber $k_p$ is incident on a nonlinear crystal 604 of length L. The pump beam 602 generates a first nonlinear polarization electromagnetic wave and a second nonlinear polarization electromagnetic wave within the nonlinear crystal 604. The first nonlinear polarization wave is called an "idler" wave that oscillates with a frequency denoted by $\omega_i$, and the second nonlinear polarization wave is called a "signal" wave that oscillates with a frequency denoted by $\omega_s$. The terms "signal" and "idler" are historical terms that have no special significance. As a result, the choice of beam labels is arbitrary. When the relative phases of the two nonlinear polarization waves and the initial pump wave add constructively, an idler beam 606 is output with the frequency $\omega_i$ and corresponding wavenumber $k_i$, and a signal beam 608 is output with the frequency $\omega_i$ and corresponding wavenumber $k_i$. For a lossless nonlinear crystal, energy conservation requires:

$$\hbar\omega_p = \hbar\omega_i + \hbar\omega_s$$

where h represents Planck's constants.

In the down-conversion process, the quantum states of the nonlinear crystal are left unchanged. In other words, the initial and final quantum-mechanical states of the nonlinear crystal 604 are identical. The different idler and signal beams 606 and 608 output from the nonlinear crystal 604 are the result of nonlinearity and birefringence, and the refractive index of the nonlinear crystal depends on the direction of polarization of the incident pump beam.

Figure 7A:
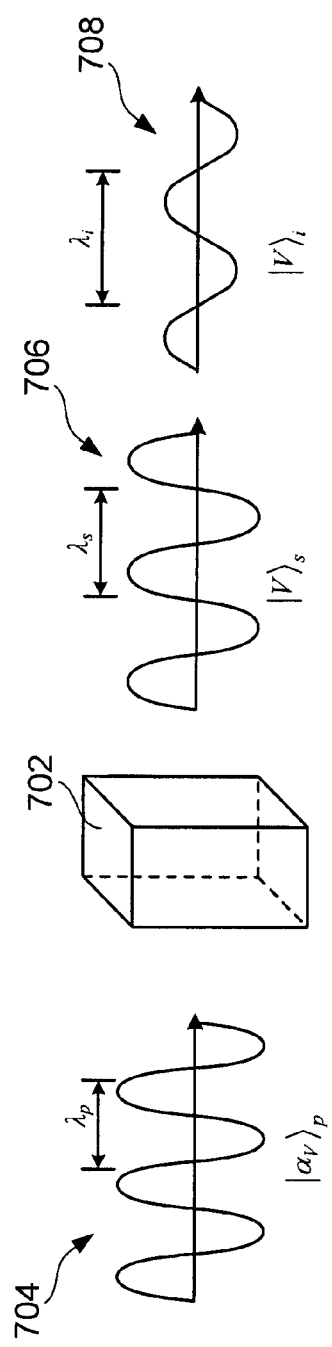
FIGS. 7A-7B show two examples of type I down-conversion.
Figure 7B:
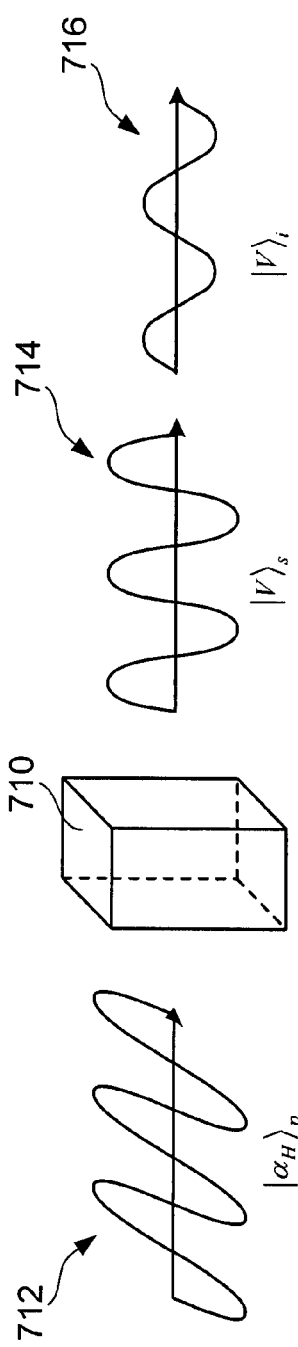
Figure 7C:
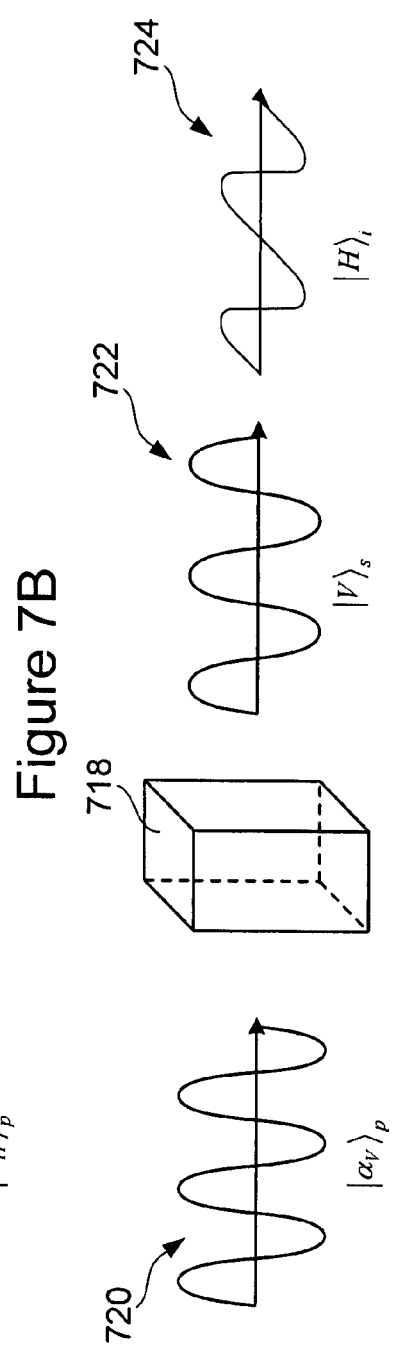
FIG. 7C shows an example of a type II down-conversion.

There are two types of down-conversion processes associated with nonlinear crystals. The first type, called "type I down conversion," occurs when the signal and idler beams output from a nonlinear crystal have identical polarizations, and the second type, called "type II down conversion," occurs when the signal and idler beams have orthogonal polarizations. FIGS. 7A-7B show two examples of type I down-conversion. In FIG. 7A, a first type I down-conversion crystal ("DCC") 702 receives a vertically polarized pump beam 704 in a coherent state denoted by $|\alpha_V\rangle_p$ and outputs both a vertically polarized signal photon $|V\rangle$ 706 and a vertically polarized idler photon $|V\rangle$ 708. In FIG. 7B, a second type I DCC 710 receives a horizontally polarized pump beam 712 in a coherent state denoted by $|\alpha_H\rangle_p$ and outputs both a vertically polarized signal photon $|V\rangle_s$ 714 and a vertically polarized idler photon $|V\rangle_i$ 716. FIG. 7C shows an example of type II down-conversion. The type II DCC 718 receives a vertically polarized pump beam 720 in a coherent state denoted by $|\alpha_V\rangle_p$ and simultaneously outputs both a vertically polarized signal photon $|V\rangle_s$ 722 and a horizontally polarized idler photon $|H\rangle_i$ 724.

The theory associated with SPDC in bulk nonlinear crystals is well established. For a bulk nonlinear crystal, down-converted signal power is integrated over all emission angles emitted in the frequency (wavelength) interval, which gives a result that is independent of the pump beam spot size. For a detailed description of the theory behind parametric down-conversion in bulk crystals see "Hot spots in parametric fluorescence with a pump beam of finite cross section," K. Koch et al., *IEEE J Quantum Electron.* 31, 769 (1995). Note, however, that the experimental conditions leading to SPDC in bulk crystals does not hold for SPDC in waveguides. There are only a finite and small number of transverse modes that can be supported by a waveguide of a given length. In addition, there may only be a single set of transverse modes that satisfy phase-matching conditions. As a result, essentially all the SPDC photons are emitted into a single transverse mode, which are generally distinct modes for the signal and idler photons and lead to a high density of SPDC photons all propagating along the waveguide resulting in a narrowing of the spectral bandwidth. Furthermore, in this geometry increasing the pump confinement does not result in a corresponding decrease in brightness due to emission into extra transverse modes, suggesting that increased confinement will result in increased signal beam and idler beam production.

The efficiency of a waveguide in a nonlinear crystal can be assessed by examining the spectral power density of a waveguide, which can be represented for the signal beam as follows:

$$\frac{dP_s}{d\lambda_s} \propto \frac{L^2 P_p}{A_I} \text{sinc}\left(\frac{\Delta k L}{2}\right)^2$$

where

L is the length of the waveguide of nonlinear crystal;
$P_p$ is power of the pump beam;
$A_I$ is the interaction effective area; and
$\Delta k = k_p - k_s - k_i$ is called the "wavevector, or momentum, mismatch."

Figure 8A:
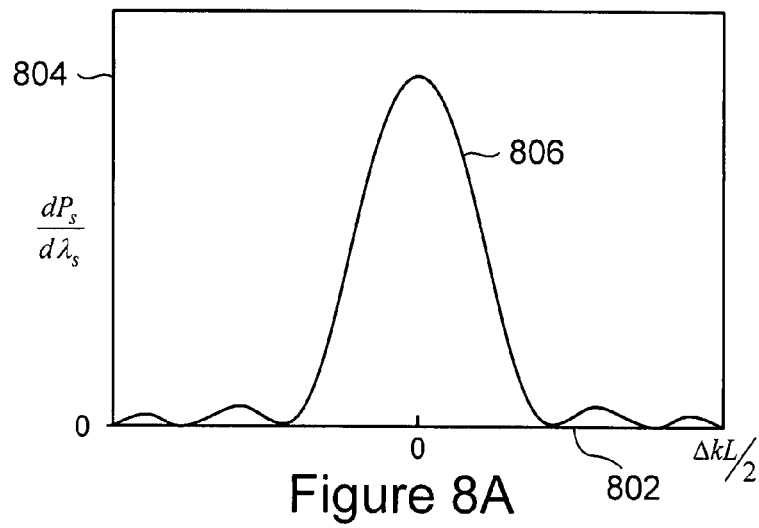
FIG. 8A shows a plot of signal beam intensity.

FIG. 8A is a plot of spectral power density versus $\Delta k L/2$. Horizontal axis 802 corresponds to a range of $\Delta k L/2$ values, vertical axis 804 corresponds to the spectral power density associated with a signal beam emitted from a nonlinear crystal waveguide, and curve 806 represents the spectral power density as a function of $\Delta k L/2$. The curve 806 shows a maximum efficiency, or spectral power density, when $\Delta k$ equals zero and shows that as $|\Delta k| L$ increases, the efficiency of the nonlinear crystal decreases. As a result, power can flow backward from the signal and idler beams into the pump beam for large nonzero values of $|\Delta k| L$. The maximum efficiency ($\Delta k = 0$) is achieved when the electromagnetic waves involved in the down-conversion process are phase matched so that they add constructively in the forward propagating direction. Note that a similarly shaped spectral power density curve exists for the idler beam and is also centered about the wavevector mismatch $\Delta k$ equal to zero.

The primary differences between SPDC in a nonlinear crystal waveguide and a bulk nonlinear crystal can be described as follows. In the nonlinear crystal waveguide, only a small number of modes effectively interact, while in the bulk nonlinear crystal, the pump Gaussian mode interacts with a continuum of plane-wave modes. The nonlinear crystal waveguide emission is confined to a limited collinear band characterized by the sinc term above, while the emission for the bulk nonlinear crystal is not collinear. For a more detailed description theoretical and experimental results of nonlinear crystal waveguides see "Spontaneous parametric down-conversion in periodically polled KTP waveguides and bulk crystals," M. Fiorentino, et al., *Optics Express, Vol.* 15, No. 12, Jun. 11, 2007; and "Spontaneous parametric down-conversion in a nanophotonic waveguide," S. Spillane et al., *Optics Express*, Vol. 15, No. 14, Jul. 9, 2007, which are herein incorporated by reference.

The phase-matching condition ($\Delta k = 0$) can often be obtained by carefully controlling the refractive indices associated with each of the pump, signal, and idler beams. Typically, phase matching is achieved by either angle tuning or temperature tuning, both of which are well-known phase-matching techniques. However, there are circumstances when angle and temperature tuning techniques are not suitable for maintaining the phase-matching condition. For example, certain nonlinear crystals may possess insufficient birefringence to compensate for the dispersion of the linear refractive indices over a wide wavelength range, and for other nonlinear crystals, electromagnetic radiation with increasingly shorter wavelengths causes the index of refraction associated with the signal beam to approach the index of refraction of the idler beam.

Figure 8B:
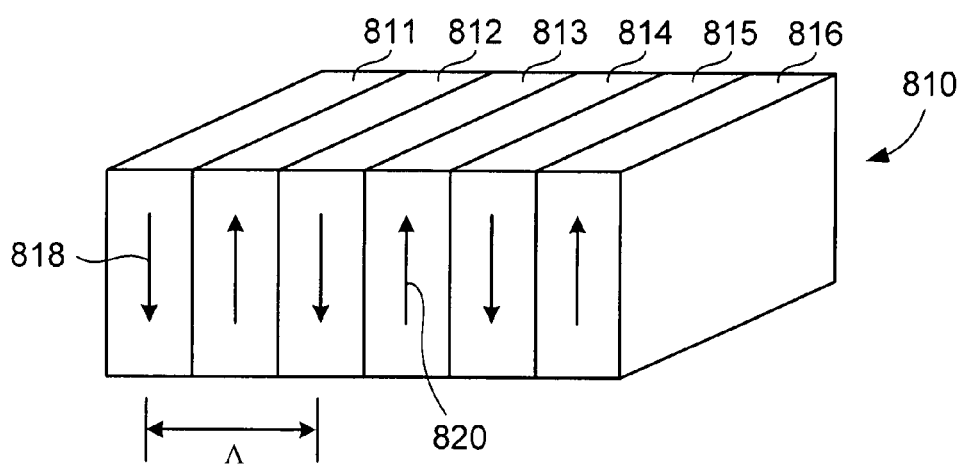
FIG. 8B shows a hypothetical periodically poled down-conversion crystal.

Quasi-phase matching can be used when normal phase matching cannot be implemented. Quasi-phase matching can be accomplished by periodically poling down-conversion crystals. FIG. 8B shows a hypothetical periodically poled down-conversion crystal 810. The down-conversion crystal 810 comprises 6 alternating layers 811-816 of the same birefrigent material. The crystal lattices of the layers 811, 813, and 815 are all oriented in the same direction, as indicated by downward directed arrows, such as downward directed arrow 818. In contrast, the crystal lattices of the layers 812, 814, and 816 are all oriented in the opposite direction of the layers 811, 812, and 815, as indicated by the upward directed arrows, such as upward directed arrow 820. The period of the alternating layers is represented by $\Lambda$. Methods for periodically poling a nonlinear crystal are well-known in the art.

Figure 8C:
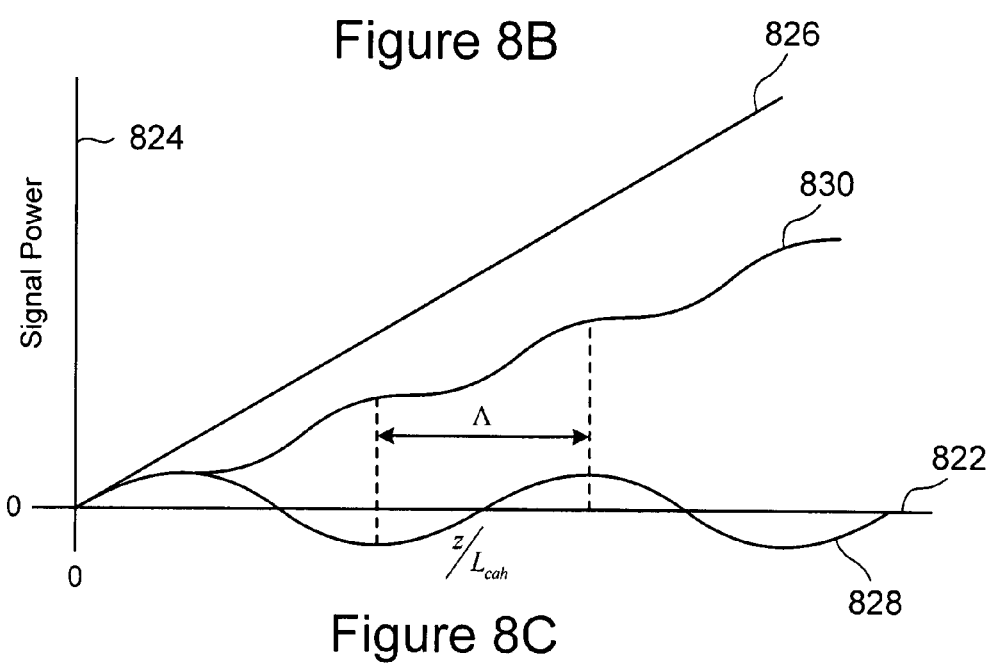
FIG. 8C is a plot of signal power generated by pump beams propagating through three different nonlinear crystals.

The following discussion describes how periodic poling can compensate for a non-zero wavevector mismatch $\Delta k$ by examining how the power of the signal is changed by the properties for three different nonlinear crystals. FIG. 8C is a plot of three signal powers, each associated with signals propagating through a different nonlinear crystal. Horizontal axis 822 corresponds to the propagation distance within each nonlinear crystal, and vertical axis 824 corresponds to the power of the signal field propagating though each nonlinear crystal in the presence of a strong pump field. Curve 826 shows that for a first single nonlinear crystal with perfectly phase-matched interaction ($\Delta k = 0$), the signal power grows linearly with propagation distance z. In contrast, curve 828 is associated with a second single nonlinear crystal, however, due to a nonzero wavevector mismatch, the field power oscillates. As a result, the average field power over the propagation distance of the second nonlinear crystal is zero. Curve 830 is associated with a periodically poled nonlinear crystal. The curve 830 shows that by periodically poling a nonlinear crystal that normally exhibits nonzero wavevector mismatch, when the power of the signal is about to decrease as a consequence of wavevector mismatch, a reversal occurs at the end of period Λ, which allows the power to grow monotonically. Similar considerations can be applied to the idler beam.

The wavevector mismatch for a periodically poled nonlinear crystal is give by:

$$\Delta k_Q = k_p - k_s - k_i - \frac{2\pi}{\Lambda} + \Delta k_{wg},$$

where $\Delta k_{wg}$ is the waveguide contribution to the phase matching, and the optimum period is:

$$\Lambda = \pm \frac{2\pi}{k_p - k_s - k_i}$$

EMBODIMENTS OF THE PRESENT INVENTION

Figure 9:
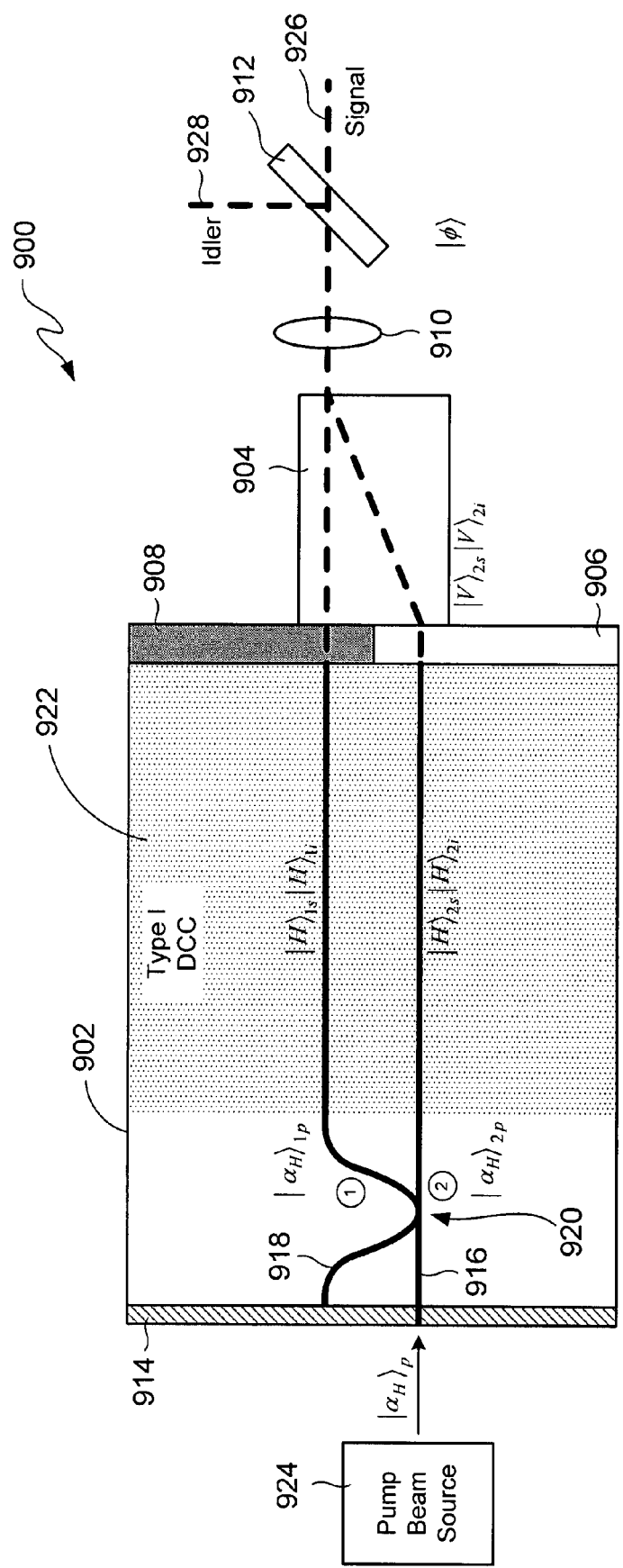
FIG. 9 shows a schematic plan view of a first polarization entangled photon source in accordance with embodiments of the present invention.

FIG. 9 shows a schematic plan view of a first polarization-entangled photon source 900 in accordance with embodiments of the present invention. The entangled photon source 900 comprises a type I DCC 902, a beam displacer 904, a HWP 906, and a dielectric spacer 908, all of which can be positioned on a single chip. The HWP 906 and the dielectric spacer 908 are positioned between the type I DCC 902 and the beam displacer 904. The entangled photon source 900 also includes a lens 910, a dichroic mirror 912, and may optionally include an antireflection coating 914 deposited on a surface of the type I DCC 902 opposite the HWP 906 and the dielectric spacer 908.

The type I DCC 902 can be a z-cut nonlinear crystal, such as z-cut $LiNbO_3$ ("lithium niobate"), $KTiOPO_4$ ("KTP"), $KTiOAsO_4$ ("KTA"), $LiIO_3$ ("lithium iodate"), $LiTaO_3$ ("lithium tantalate") or any other suitable nonlinear crystal material or nonlinear electrooptic polymer. The type I DCC 902 includes an optic axis, and the term "z-cut" indicates that this optic axis is directed perpendicular to the plane of the type I DCC 902. The beam displacer 904 can be α-BBO, calcite, NbO, LBO, or another suitable birefringent crystal. The optional antireflection coating 914 can be composed of magnesium oxide.

As shown in FIG. 9, and in subsequent embodiments show in FIGS. 10-14, the type I DCC 902 includes waveguides represented by heavy solid lines 916 and 918. The path of electromagnetic radiation transmitted through the beam displacer 904, the half wave plate 906, and the dielectric spacer 908 are represented by heavy dashed lines. The waveguides 916 and 918 can be ridge waveguides, or regions having a higher refractive index than the remainder of the entangled photon source 900. The waveguides can be formed by doping specific regions of the type I DCC, 902 with protons or atoms. For example, waveguides with a higher refractive index than the rest of a $LiNbO_3$ crystal layer can be formed in the $LiNbO_3$ crystal layer by infusing regions with Ti. For a more detailed description of waveguides in DCCs, see the above sited references by M. Fiorentino and S. Spillane. In FIG. 9, the waveguide 918 bends toward waveguide 916 forming a 50:50 BSC 920. Note that in other embodiments of the present invention, a Y-shaped waveguide may be used in place of the BSC 920. Shaded region 922 represents a periodically poled region of the type I DCC 902. The HWP 906 rotates polarized electromagnetic radiation output from the waveguide 916 by approximately 90°. The dielectric spacer 908 does not rotate polarized electromagnetic radiation output from the waveguide 918, can be comprised of $SiO_2$ or another suitable dielectric material, and is included to substantially balance the path lengths of electromagnetic radiation output from the type I DCC 902. The beam displacer 904 is positioned and configured to combine beams of electromagnetic radiation output from the waveguides 916 and 918 into a single beam of electromagnetic radiation. The entangled photon source 900 can be supported by a substrate (not shown) having a lower refractive index than the entangled photon source 900 and does not interfere with the transmission of electromagnetic radiation in the waveguides. For example, $SiO_2$, poly(methyl methacrylate) ("PMMA") can be used to form the substrate.

The entangled photon source 900 receives a pump beam in either a horizontally or vertically polarized coherent state from a pump beam source 924. The terms "horizontal" and "horizontally" refer to electromagnetic waves with electric field components that are polarized parallel to the plane of an entangled photon source, and the terms "vertical" and "vertically" refer to electromagnetic waves with electric field components that are polarized orthogonal to the plane of the entangled photon source. The pump beam can be a continuous electromagnetic wave or an electromagnetic-wave pulse that is input to the waveguide 916. Optional antireflection coating 914 can be used to prevent at least a portion of the pump beam from penetrating other regions of the type I DCC 902. The entangled photon source 900 outputs polarization-entangled photons in an entangled state represented by:

$$|\phi\rangle = \frac{1}{\sqrt{2}}(|V\rangle_s |V\rangle_i + e^{i\theta}|H\rangle_s |H\rangle_i)$$

where $|H\rangle_s$ and $|V\rangle_s$ represent horizontally and vertically polarized signal labeled photons output in signal output channel 926;

$|H\rangle_i$ and $|V\rangle_i$ represent horizontally and vertically polarized idler labeled photons output in idler output channel 928; and θ is a relative phase difference between the horizontally and vertically polarized photons.

Generating polarization-entangled photons in the state $|\phi\rangle$ using a pump beam in a horizontally polarized, coherent state, denoted by $|\alpha_H\rangle_p$ output from the pump beam source 924 is described as follows. The 50:50 BSC 920 receives the pump beam $|\alpha_H\rangle_p$ in the waveguide 916 and outputs two path dependent pump beams in a coherent linear superposition of states represented by:

$$|\beta\rangle = \frac{1}{\sqrt{2}}(|\alpha_H\rangle_{1p} + |\alpha_H\rangle_{2p})$$

where $|\alpha_H\rangle_{1p}$ represents a horizontally polarized pump beam transmitted in the waveguide 918; and $|\alpha_H\rangle_{2p}$ represents a horizontally polarized pump beam transmitted in the waveguide 916.

In the following description of various embodiments of the present invention, numerical subscripts on states are used to identify path dependence of photons transmitted along waveguides in the DCCs. The paths are identified in FIGS. 9-14 by circled numbers. For example, the subscript "1"

associated with the coherent state $|\alpha_H\rangle_{1p}$ corresponds to electromagnetic radiation in a coherent state transmitted in the upper waveguide 918 which is also identified in FIGS. 9-14 by the circled number "1."

As the horizontally and vertically polarized pump beams $|\alpha_H\rangle_{1p}$ and $|\alpha_H\rangle_{2p}$ are transmitted though the type I DCC 902, the horizontally polarized pump beam $|\alpha_H\rangle_{1p}$ transmitted in the waveguide 918 is converted into a pair of horizontally polarized signal and idler photons, which is represented as follows:

$$|\alpha_H\rangle_{1p} \xrightarrow{Type\ I} |H\rangle_{1s}|H\rangle_{1i}$$

and the horizontally polarized pump beam $|\alpha_H\rangle_{2p}$ transmitted in the waveguide 916 is converted into a pair of horizontally polarized signal and idler photons, which is also represented as follows:

$$|\alpha_H\rangle_{2p} \xrightarrow{Type\ I} |H\rangle_{2s}|H\rangle_{2i}$$

The HWP 906 receives the horizontally polarized signal and idler photons $|H\rangle_{2s}|H\rangle_{2i}$ and outputs vertically polarized signal and idler photons $|V\rangle_{2s}|V\rangle_{2i}$. The beam displacer 904 removes path dependence by combining the signal and idler photons in the state $|V\rangle_{2s}|V\rangle_{2i}$ with the signal and idler photons in the state $|H\rangle_{1s}|H\rangle_{1i}$ into one path and outputs polarization-entangled photons in the state $|\phi\rangle$. Lens 910 collimates polarization-entangled photons output from the beam displacer 904. The dichroic mirror 912 separates the polarization-entangled photons in state $|\phi\rangle$ into signal and idler photons, which are transmitted in the output channels 926 and 928, respectively. For example, when vertically polarized photons $|V\rangle_s$ are detected in the signal output channel 926, vertically polarized photons $|V\rangle_i$ are detected in the idler output channel 928. On the other hand, the state $|\phi\rangle$ also indicates that when horizontally polarized photons $|H\rangle_s$ are detected in the signal output channel 926, horizontally polarized photons $|H\rangle_i$ are detected in the idler output channel 928. The output channels 926 and 928 can be coupled to a quantum computer, quantum information processor or storage device, a quantum-cryptographic device, quantum teleportation device or other optical-based device or network that employs polarization-entangled photons.

Note that in other embodiments of the present invention, the pump beam source 924 can be tuned to input a beam in a vertically polarized, coherent state, denoted by $|\alpha_V\rangle_p$, to waveguide 916 of the entangled photon source 900, which also yields polarization-entangled photons in the state $|\phi\rangle$.

Figure 10:
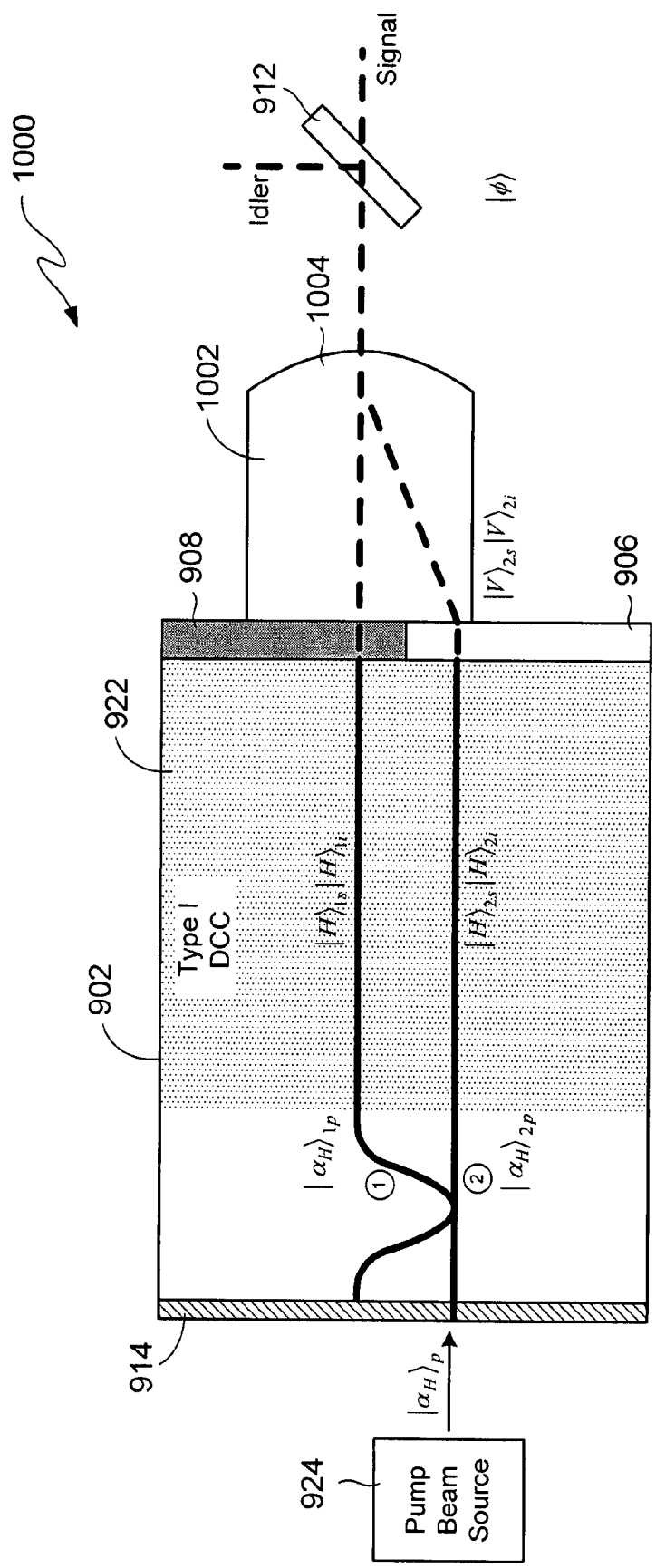
FIG. 10 shows a schematic plan view of a second polarization entangled photon source in accordance with embodiments of the present invention.

FIG. 10 shows a schematic plan view of a second polarization-entangled photon source 1000 in accordance with embodiments of the present invention. Entangled photon source 1000 is nearly identical to the entangled photon source 900 except the beam displacer 904 and the lens 910 of the entangled photon source 900 have been replaced by a beam displacer 1002 with a lensed outer surface 1004 that collimates the beam output from the birefringent crystal 1002. The entangled photon source 1000 performs the same operations on polarized beams input from the pump beam source 924 yielding polarization-entangled photons in the state $|\phi\rangle$.

Figure 11:
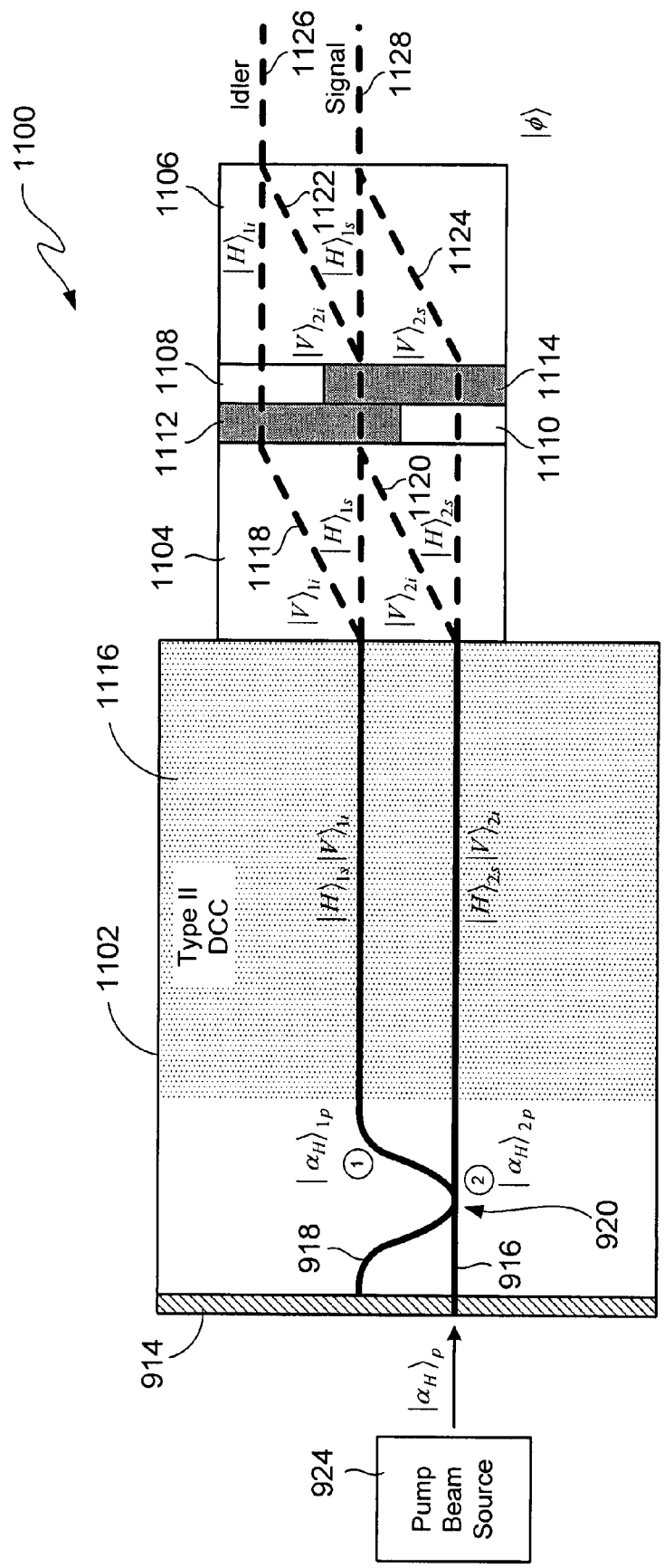
FIG. 11 shows a schematic plan view of a third polarization entangled photon source in accordance with embodiments of the present invention.

In other embodiments of the present invention, polarization-entangled photons in the state $|\phi\rangle$ can be generated using a type II DCC. FIG. 11 shows a schematic plan view of a third polarization-entangled photon source 1100 in accordance with embodiments of the present invention. As shown in FIG. 11, the entangled photon source 1100 comprises a type II DCC 1102, a first beam displacer 1104 separated from a second beam displacer 1106 by a first HWP 1108, a second HWP 1110, a first dielectric spacer 1112, and a second dielectric spacer 1114, all of which can be positioned on a single chip. The type II DCC 1102 can be a z-cut nonlinear crystal, such as lithium niobate, KTP, KTA, lithium niobate, lithium iodate, lithium, tantalate, or any other suitable nonlinear crystal or electrooptic polymer with the optic axis positioned perpendicular to the plane of the type II DCC 1102. The type II DCC 1102 also includes a periodically poled region 1116. The first beam displacer 1104 is positioned and configured so that beams of vertically polarized electromagnetic radiation transmitted in the waveguides 918 and 916 branch into paths 1118 and 1120, respectively, and the second beam displacer 1106 is positioned and configured so that that beams of vertically polarized electromagnetic radiation output from dielectric spacer 1114 branch into paths 1122 and 1124. The entangled photon source 1100 can be supported by a $SiO_2$, PMMA, or any other substrate (not shown) that has a lower refractive index than entangled photon source 1100 and does not interfere with electromagnetic radiation transmitted in the waveguides.

The entangled photon source 1100 receives a pump beam in either a horizontally or vertically polarized coherent state from the pump beam source 924. The pump beam can also be a continuous electromagnetic wave or an electromagnetic-wave pulse that is input in a waveguide 916. The entangled photon source 1100 outputs polarization-entangled photons in the entangled state $|\phi\rangle$. As described above with reference to entangled photon source 900, the 50:50 BSC 920 receives the pump beam $|\alpha_H\rangle_p$ in the waveguide 916 and outputs electromagnetic radiation in a coherent linear superposition of states $|\beta\rangle$, as described above with reference to FIG. 9. The type II DCC 1102 converts the horizontally polarized pump beam $|\alpha_H\rangle_{1p}$ transmitted in the waveguide 918 into a pair of horizontally and vertically polarized signal and idler photons, which is represented as follows:

$$|\alpha_H\rangle_{1p} \xrightarrow{Type\ II} |H\rangle_{1s}|V\rangle_{1i}$$

and converts the horizontally polarized pump beam $|\alpha_H\rangle_{2p}$ transmitted in the waveguide 916 into another pair of horizontally and vertically polarized signal and idler photons, which is represented as follows:

$$|\alpha_H\rangle_{2p} \xrightarrow{Type\ II} |H\rangle_{2s}|V\rangle_{2i}$$

The state of photons output from the type II DCC 1102 is given by:

$$\frac{1}{\sqrt{2}}(|H\rangle_{1s}|V\rangle_{1i} + e^{i\theta}|H\rangle_{2s}|V\rangle_{2i})$$

The first and second birefringent crystals 1104 and 1106 and HWPs 1108 and 1110 are configured, as shown in FIG. 11, to place the idler photons in idler output channel 1126 and signal photons in signal output channel 1128 as follows. The first beam displacer 1104 splits the pair of photons in the state $|H\rangle_{1s}|V\rangle_{1i}$ output from the waveguide 918 so that vertically polarized idler photons $|V\rangle_{1i}$ are transmitted along the path 1118 and splits the pair of photons $|H\rangle_{2s}|V\rangle_{2i}$ output from the waveguide 916 so that vertically polarized idler photons $|V\rangle_{2i}$ are transmitted along the path 1120. Vertically polarized photons $|V\rangle_{2i}$ transmitted along the path 1120 combine with horizontally polarized photons $|H\rangle_{1s}$ and their polarization states are unchanged by dielectric spacers 1112 and 1114. The HWP 1108 converts vertically polarized photons $|V\rangle_{1i}$ into horizontally polarized photons $|H\rangle_{1i}$, and the HWP 1110 converts horizontally polarized photons $|H\rangle_{2i}$ into vertically polarized photons $|V\rangle_{2i}$. As a result, after the first HWP 1108 and the second dielectric spacer 1114, the photons entering beam displacer 1106 are in an entangled polarization state that is mathematically represented by:

$$\frac{1}{\sqrt{2}}(|H\rangle_{1s}|H\rangle_{1i} + e^{i\theta}|V\rangle_{2s}|V\rangle_{2i})$$

The second beam displacer 1106 removes path dependence by combining idler photons in the idler output channel 1126 and by combining signal photons in the signal output channel 1128 in order to yield polarization-entangled photons in the entangled state $|\phi\rangle$. When vertically polarized photons $|V\rangle_s$ are detected in the signal output channel 1128, vertically polarized photons $|V\rangle_i$ are detected in idler output channel 1126, and when horizontally polarized photons $|H\rangle_s$ are detected in the signal output channel 1128, horizontally polarized photons $|H\rangle_i$ are detected in the idler output channel 1126.

Figure 12:
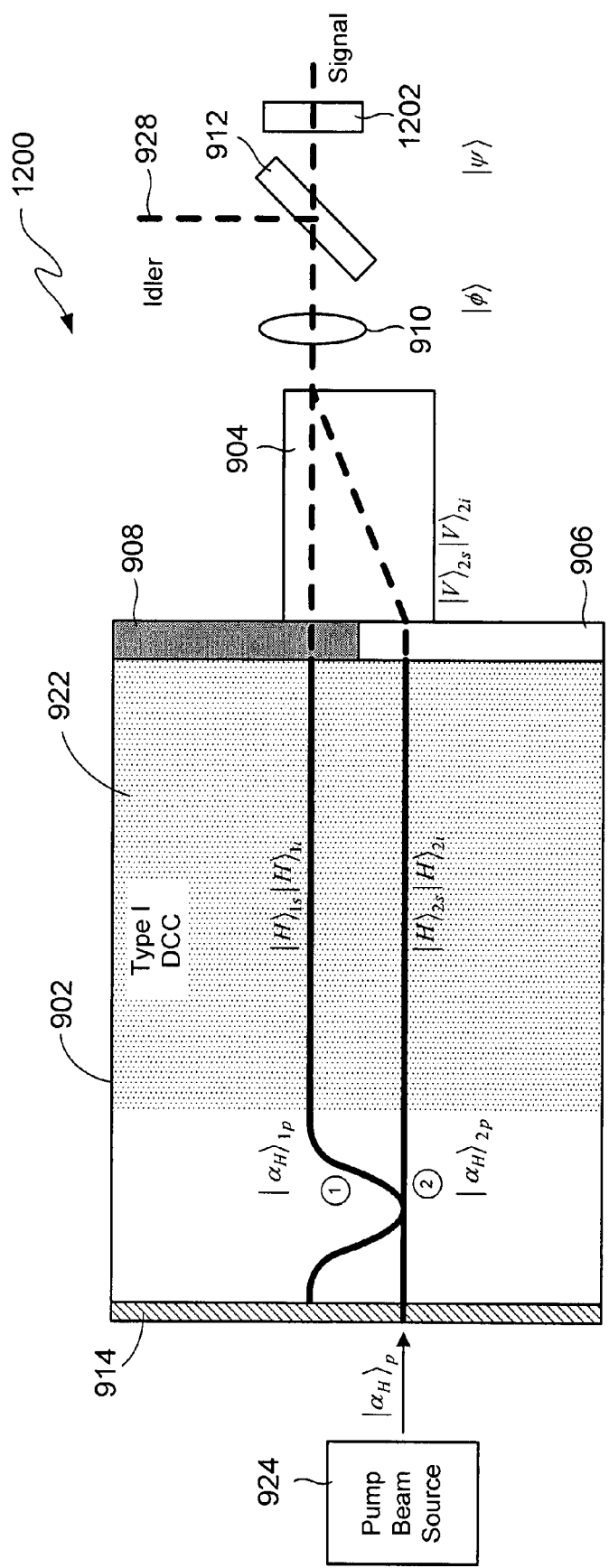
FIG. 12 shows a schematic plan view of a fourth polarization entangled photon source in accordance with embodiments of the present invention.

In other embodiments of the present invention, polarization-entangled photons in the state $|\psi\rangle$ can be generated by introducing a HWP into either the idler output channel or the signal output channel of the entangled photon sources 900, 1000, and 1100 described above with reference to FIGS. 9-11. FIG. 12 shows a schematic plan view of a fourth polarization-entangled photon source 1200 in accordance with embodiments of the present invention. The entangled photon source 1200 is identical to the entangled photon source 900, shown in FIG. 9, except for an additional HWP 1202 located in the signal output channel 926. The HWP 1202 operates on the signal beam photons output from the dichroic mirror 912 as follows:

$$|\phi\rangle = \frac{1}{\sqrt{2}}(|V\rangle_s|V\rangle_i + e^{i\theta}|H\rangle_s|H\rangle_i) \xrightarrow{HWP} \frac{1}{\sqrt{2}}(|H\rangle_s|V\rangle_i + e^{i\theta}|V\rangle_s|H\rangle_i) = |\psi\rangle$$

As a result, when horizontally polarized photons $|H\rangle_s$ are detected in the signal output channel 926, vertically polarized photons $|V\rangle_i$ are detected in the idler output channel 928, and when vertically polarized photons $|V\rangle_s$ are detected in the signal output channel 926, horizontally polarized photons $|H\rangle_i$ are detected in the idler output channel 928.

Figure 13:
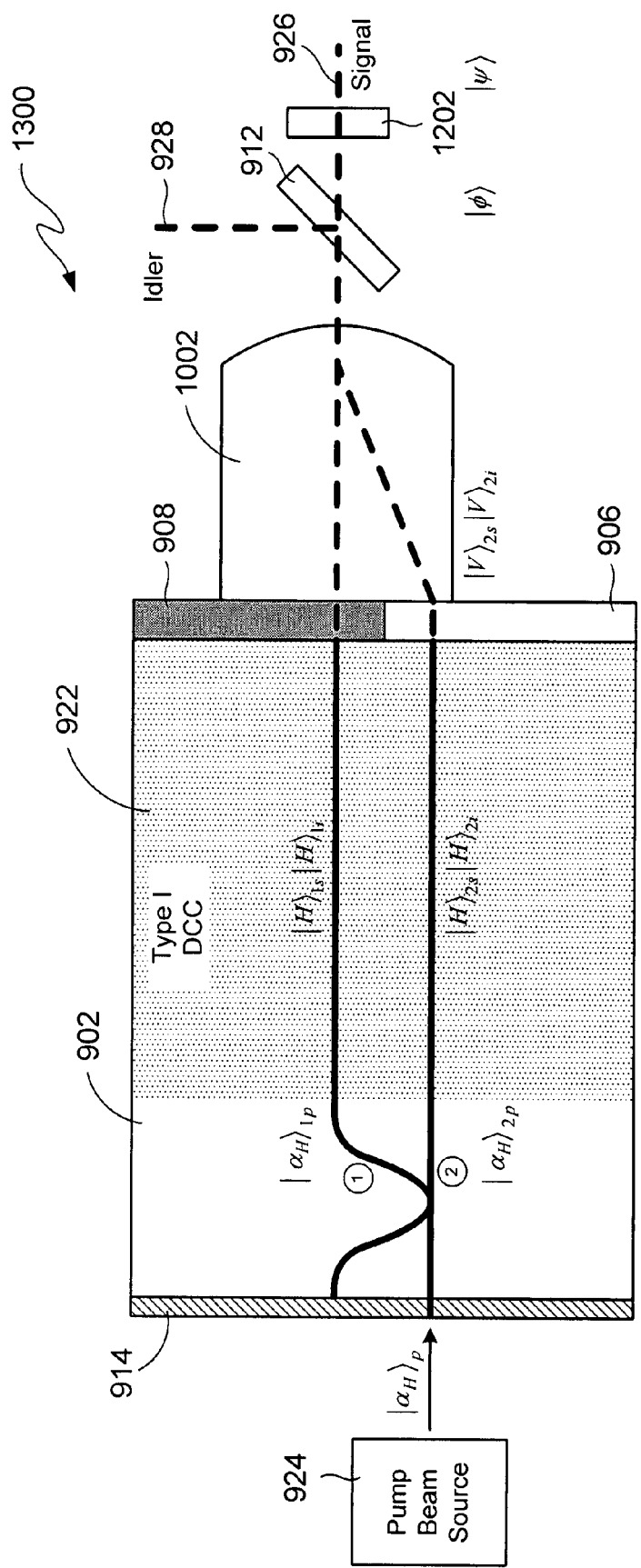
FIG. 13 shows a schematic plan view of a fifth polarization entangled photon source in accordance with embodiments of the present invention.

FIG. 13 shows a schematic plan view of a fifth polarization-entangled photon source 1300 in accordance with embodiments of the present invention. The entangled photon source 1300 is identical to the entangled photon source 1200, shown in FIG. 12, except the HWP 1202 is located in the signal output channel 926. The HWP 1002 operates on the signal beam photons output from the dichroic mirror 912 to give:

$$|\phi\rangle \xrightarrow{HWP} |\psi\rangle$$

Figure 14:
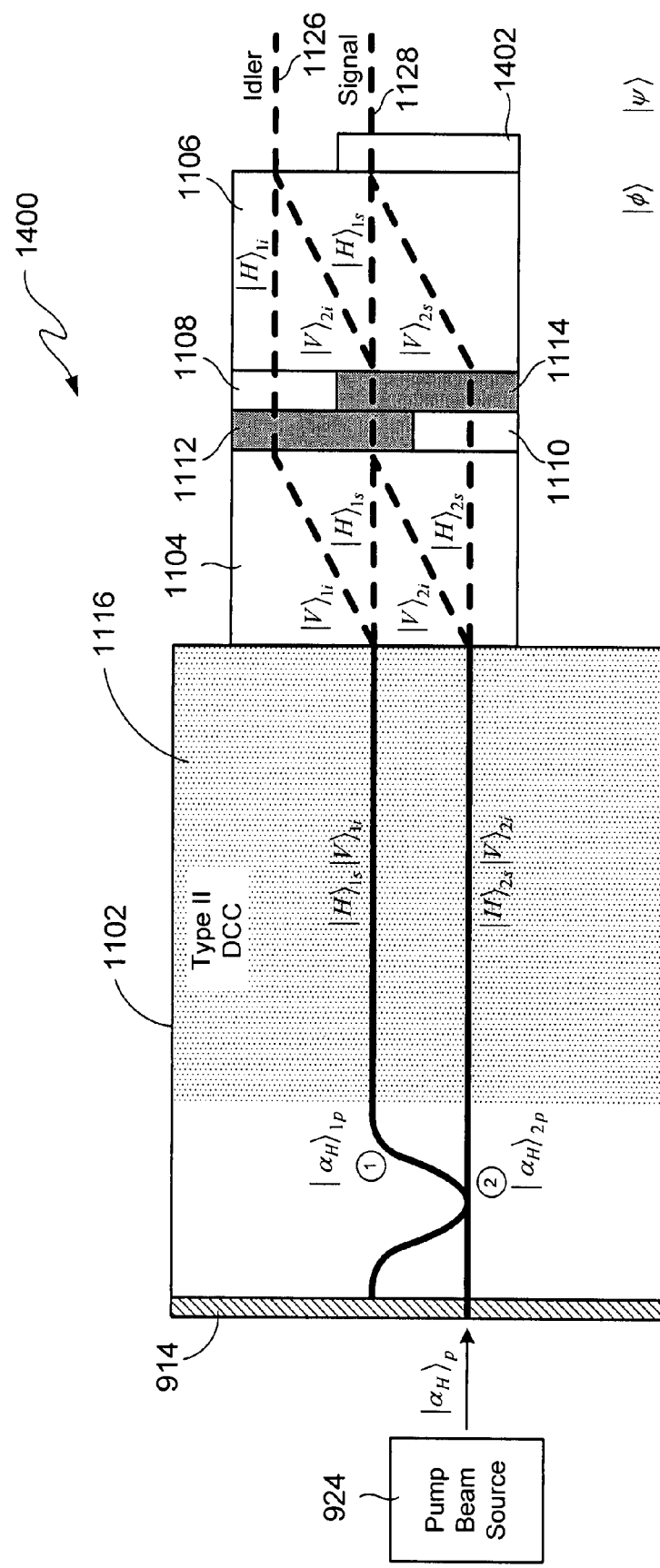
FIG. 14 shows a schematic plan view of a sixth polarization entangled photon source in accordance with embodiments of the present invention.

FIG. 14 shows a schematic plan view of a sixth polarization-entangled photon source 1400 in accordance with embodiments of the present invention. The entangled photon source 1400 is identical to the entangled photon source 1100, shown in FIG. 11, except a HWP 1402 is located in the signal output channel 1128. The HWP 1402 operates on the signal beam photons output from the second birefringent crystal to give:

$$|\phi\rangle \xrightarrow{HWP} |\psi\rangle$$

In other embodiments of the present invention, the HWPs 1202 and 1402 can be placed in the idler output channels to give polarization-entangled photons in the state $|\psi\rangle$.

EXAMPLES

When the pump beam source 924 is configured to output a pump beam with a wavelength of approximately 405 nm, the entangled photon sources 900 and 1000 emit entangled signal and idler photon pairs with corresponding wavelengths of approximately 800 and 820 nm. When the pump beam source 924 is configured to output a pump beam with a wavelength of approximately 650 nm, the entangled photon sources 900 and 1000 emit entangled signal and idler photon pairs with corresponding wavelengths of approximately 1290 and 1310 nm. When the pump beam source 924 is configured to output a pump beam with a wavelength of approximately 780 nm, the entangled photon sources 900 and 1000 emit entangled signal and idler photon pairs with corresponding wavelengths of approximately 1550 and 1570 nm.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A polarization-entangled photon source comprising:
   a down conversion crystal including a periodically poled region and an unpoled region and having a first waveguide and a second waveguide traversing the poled and unpoled regions, wherein within the unpoled region, the first waveguide and the second waveguide are configured to form a beamsplitter that splits a coherent beam of electromagnetic radiation in a first polarization state into a first beam carried by the first waveguide and a second beam carried by the second waveguide, and within the periodically poled region, the first beam is converted into a first pair of signal and idler photons carried by the first waveguide and the second beam is converted into a second pair of signal and idler photons carried by the second waveguide;

a dielectric spacer positioned adjacent to the down conversion crystal and configured to receive the first pair of signal and idler photons emitted from the first waveguide in the first polarization state;

a half-wave plate positioned adjacent to the down conversion crystal and configured to receive the second pair of signal and idler photons emitted from the second waveguide and rotate the second pair of signal and idler photons into a second polarization state orthogonal to the first polarization state; and a beam displacer positioned adjacent to the dielectric spacer and the half-wave plate and configured to combine the first and second pair of signal and idler photons output from the dielectric spacer and the half-wave plate into a single beam of polarization-entangled signal and idler photons.

2. The source of claim 1 further comprising a lens positioned and configured to collimate the single beam of polarization-entangled signal and idler photons output from the beam displacer.

3. The source of claim 1 wherein the beam displacer further comprises a lensed outer surface that is configured to collimate the single beam of polarization-entangled signal and idler photons.

4. The source of claim 1 further comprises a pump beam source positioned to input the coherent beam of electromagnetic radiation in a first polarization state into either the first waveguide or the second waveguide.

5. The source of claim 1 wherein the down conversion crystal further comprises a type I down conversion crystal.

6. The source of claim 1 wherein the first waveguide and the second waveguide further comprise one of:
 ridge waveguides; and
 regions of the down conversion crystal having a higher refractive index than remaining regions of the type I down conversion crystal.

7. The source of claim 1 wherein the down conversion crystal further comprises one of:
 $LiNbO_3$;
 $KTiOPO_4$;
 $KTiOAsO_4$;
 $LiIO_3$;
 $LiTaO_3$;
 any other suitable nonlinear crystal material; and
 an electrooptic polymer.

8. The source of claim 1 wherein the beam displacer further comprises one of:
 $\alpha\text{-}BaBr_2O_4$;
 $CaCO_3$;
 $NbO$;
 $LiB_3O_5$; and
 any other suitable birefringent crystal.

9. The source of claim 1 further comprises a dichroic mirror configured to separate the signal beam of photons and the idler beam of photons.

10. The source of claim 9 further comprising a half-wave plate located in the path of the idler beam of electromagnetic radiation or the path of the signal beam of electromagnetic radiation.

11. A polarization-entangled photon source comprising:
 a down conversion crystal including a periodically poled region and an unpoled region and having a first waveguide and a second waveguide traversing the poled and unpoled regions, wherein within the unpoled region, the first waveguide and the second waveguide are configured to form a beamsplitter that splits a coherent beam of electromagnetic radiation in a first polarization state into a first beam carried by the first waveguide and a second beam carried by the second waveguide, within in the periodically poled region, the first beam is converted into first signal and idler photons carried by the first waveguide and the second beam is converted into second signal and idler photons carried by the second waveguide, and the signal photons are in a first polarization state and the idler photons are in a second polarization;

a first beam displacer positioned adjacent to the down conversion crystal and configured to separate first signal and idler photons output from the first waveguide and separate second signal and idler photons output from the second waveguide;

a first half-wave plate positioned adjacent to the first beam displacer and configured to rotate the first idler photon into the first polarization state;

a second half-wave plate positioned adjacent to the first beam displacer and configured to rotate the second signal photon into the second polarization state; and a second beam displacer positioned adjacent to the first and second half wave plates and configured to output the first and second signal photons in a signal beam and the first and second idler photons in an idler beam of polarization-entangled photons.

12. The source of claim 11 further comprising at least one dielectric spacer positioned between the first beam displacer and the second beam displacer.

13. The source of claim 11 wherein the down conversion crystal further comprises a pump beam source positioned to input the coherent beam of electromagnetic radiation in a first polarization state into either the first waveguide or the second waveguide.

14. The source of claim 11 wherein the down conversion crystal further comprises a type II down conversion crystal.

15. The source of claim 11 wherein the first waveguide and the second waveguide further comprise one of:
 low-index contrast waveguide; and
 high-index contrast waveguide.

16. The source of claim 15 wherein the low-index contrast waveguide further comprises an ion diffusion-based waveguide.

17. The source of claim 11 wherein the down conversion crystal further comprises one of:
 $LiNbO_3$;
 $KTiOPO_4$;
 $KTiOAsO_4$;
 $LiIO_3$;
 $LiTaO_3$;
 any other suitable nonlinear crystal material; and
 an electrooptic polymer.

18. The source of claim 11 wherein the beam displacer further comprises one of:
 $\alpha\text{-}BaBr_2O_4$;
 $CaCO_3$;
 $NbO$;
 $LiB_3O_5$; and
 any other suitable birefringent crystal.

19. The source of claim 11 further comprises a half-wave plate located in the path of either the first output beam or the path of the second output beam.

* * * * *

UNITED STATES PATENT AND TRADEMARK OFFICE
CERTIFICATE OF CORRECTION

PATENT NO. : 7,489,436 B1  
APPLICATION NO. : 11/900347  
DATED : February 10, 2009  
INVENTOR(S) : Marco Fiorentino et al.

Page 1 of 1

It is certified that error appears in the above-identified patent and that said Letters Patent is hereby corrected as shown below:

In column 1, line 18, delete " $|\rangle$ " and insert -- $|1\rangle$ --, therefor.

In column 1, line 24, after "as {" delete " $|1\rangle$ " and insert -- $|0\rangle$ --, therefor.

In column 1, line 64, delete " $|0\rangle$ " and insert -- $|0\rangle$ --, therefor.

In column 2, line 56, delete " $|\psi\rangle_{12}=|\psi\rangle|\omega\rangle_2$ " and insert -- $|\psi\rangle_{12}=|\psi\rangle_1|\psi\rangle_2$ --, therefor.

In column 3, line 9, delete " $|1\rangle|1\rangle_2$ " and insert -- $|1\rangle_1|1\rangle_2$ --, therefor.

In column 3, line 42, delete " $|\rangle_2$ " and insert -- $|0\rangle_2$ --, therefor.

In column 3, line 53, delete " $|\psi^+\rangle_2$ " and insert -- $|\psi^+\rangle_{12}$ --, therefor.

In column 8, line 36, delete "$\omega_i$" and insert -- $\omega_s$ --, therefor.

In column 8, line 37, delete "$k_i$" and insert -- $k_s$ --, therefor.

In column 8, line 45, delete "h" and insert -- $\hbar$ --, therefor.

In column 8, line 64, delete " $|V\rangle$ " and insert -- $|V\rangle_s$ --, therefor.

In column 8, line 65, delete " $|V\rangle$ " and insert -- $|V\rangle_i$ --, therefor.

In column 15, line 3, delete " $|V\rangle_{1i}$ " and insert -- $|V\rangle_{1i}$ --, therefor.

Signed and Sealed this

Eighth Day of September, 2009

David J. Kappos  
*Director of the United States Patent and Trademark Office*